United States Patent
Ushiki et al.

(10) Patent No.: US 9,549,167 B2
(45) Date of Patent: Jan. 17, 2017

(54) DATA STRUCTURE, IMAGE PROCESSING APPARATUS AND METHOD, AND PROGRAM

(75) Inventors: Suguru Ushiki, Tokyo (JP); Takafumi Morifuji, Tokyo (JP)

(73) Assignee: Sony Corporation, Tokyo (JP)

( * ) Notice: Subject to any disclaimer, the term of this patent is extended or adjusted under 35 U.S.C. 154(b) by 723 days.

(21) Appl. No.: 13/085,680

(22) Filed: Apr. 13, 2011

(65) Prior Publication Data

US 2011/0254919 A1    Oct. 20, 2011

(30) Foreign Application Priority Data

Apr. 20, 2010   (JP) ................. 2010-097213

(51) Int. Cl.
*H04N 13/00* (2006.01)
*H04N 21/434* (2011.01)
*H04N 21/44* (2011.01)

(52) U.S. Cl.
CPC .......... *H04N 13/007* (2013.01); *H04N 13/004* (2013.01); *H04N 13/0022* (2013.01); *H04N 13/0066* (2013.01); *H04N 21/4347* (2013.01); *H04N 21/44008* (2013.01)

(58) Field of Classification Search
None
See application file for complete search history.

(56) References Cited

U.S. PATENT DOCUMENTS

| | | | |
|---|---|---|---|
| 8,358,331 B2* | 1/2013 | Suh et al. | 348/46 |
| 2006/0125921 A1* | 6/2006 | Foote | 348/159 |
| 2007/0052794 A1* | 3/2007 | Ha et al. | 348/42 |
| 2008/0089428 A1 | 4/2008 | Nakamura et al. | |
| 2008/0112616 A1* | 5/2008 | Koo et al. | 382/171 |
| 2009/0096863 A1* | 4/2009 | Kim et al. | 348/42 |

FOREIGN PATENT DOCUMENTS

| | | | | |
|---|---|---|---|---|
| JP | 10-327430 | 12/1998 | | |
| JP | 2008-182669 | 8/2008 | | |
| WO | WO 2010046824 A1 * | 4/2010 | ......... | H04N 13/0018 |

* cited by examiner

*Primary Examiner* — James M Anderson, II
(74) *Attorney, Agent, or Firm* — Paratus Law Group, PLLC (57) ABSTRACT

An image processing apparatus includes: an acquisition mechanism acquiring image data of a 3D image including a left-eye image and a right-eye image, and superimposed-area information being information on a superimposed area included in the left-eye image and the right-eye image; and a disparity detection mechanism detecting an amount of disparity in an area excluding the superimposed area identified by the superimposed-area information of the left-eye image and the right-eye image.

22 Claims, 11 Drawing Sheets

RIGHT-EYE IMAGE

LEFT-EYE IMAGE

SHIFT IMAGE OTHER THAN SUPERIMPOSED AREA (MENU AREA) →

RIGHT-EYE IMAGE

LEFT-EYE IMAGE

DATA STRUCTURE, IMAGE PROCESSING APPARATUS AND METHOD, AND PROGRAM

BACKGROUND OF THE INVENTION

1. Field of the Invention

The present invention relates to a data structure, an image processing apparatus and method, and a program. In particular, the present invention relates to a data structure, an image processing apparatus and method, and a program that allows improving precision of disparity detection and disparity control of a 3D image having superimposed information.

2. Description of the Related Art

Although 2D images are prevailing in video contents, such as a movie, etc., 3D images attract people's attention in these days. Various techniques have been proposed on 3D-image display apparatuses, and methods of coding and decoding 3D images (for example, refer to Japanese Unexamined Patent Application Publication Nos. 10-327430 and 2008-182669).

A 3D image includes a left-eye image viewed by a left eye and a right-eye image viewed by a right eye. By setting a predetermined disparity between the left-eye image and the right-eye image, a viewer is allowed to perceive the 3D image as a stereoscopic image.

SUMMARY OF THE INVENTION

Incidentally, a 3D image sometimes includes superimposed information, such as subtitles, etc., in the same manner as a 2D image. When processing, such as disparity detection, etc., is performed on a 3D image including such superimposed information, it is sometimes difficult to perform correct disparity detection because of the superimposed information.

The present invention has been made in view of these circumstances. It is desirable to allow improving precision of disparity detection and disparity control on a 3D image having superimposed information.

According to an embodiment of the present invention, there is provided an image processing apparatus including: an acquisition means for acquiring image data of a 3D image including a left-eye image and a right-eye image, and superimposed-area information being information on a superimposed area included in the left-eye image and the right-eye image; and a disparity detection means for detecting an amount of disparity in an area excluding the superimposed area identified by the superimposed-area information of the left-eye image and the right-eye image.

According to another embodiment of the present invention, there is provided a method of processing an image by an image processing apparatus performing image processing of a 3D image including a left-eye image and a right-eye image, the method including the steps of: acquiring image data of the 3D image and superimposed-area information being information on a superimposed area included in the left-eye image and the right-eye image; and detecting an amount of disparity in an area excluding the superimposed area identified by the superimposed-area information of the left-eye image and the right-eye image.

According to another embodiment of the present invention, there is provided a program for causing a computer to perform processing including the steps of: acquiring image data of the 3D image including a left-eye image and a right-eye image, and superimposed-area information being information on a superimposed area included in the left-eye image and the right-eye image; and detecting an amount of disparity in an area excluding the superimposed area identified by the superimposed-area information of the left-eye image and the right-eye image.

By an embodiment of the present invention, a 3D image including a left-eye image and a right-eye image and superimposed-area information being information on a superimposed area included in the left-eye image and the right-eye image are obtained. And detection is performed on an amount of disparity in an area excluding the superimposed area identified by the superimposed-area information of the left-eye image and the right-eye image.

According to another embodiment of the present invention, there is provided a data structure for content data of a 3D content, including: image data of a 3D image including a left-eye image and a right-eye image; and superimposed-area information being information on a superimposed area included in the left-eye image and the right-eye image.

In another embodiment of the present invention, as content data of a 3D content, image data of a 3D image including a left-eye image and a right-eye image and superimposed-area information being information on a superimposed area included in the left-eye image and the right-eye image are included.

In this regard, it is possible to provide the program by transmitting it through a transmission medium, or by recording it on a recording medium.

The image processing apparatus may be an independent apparatus, or may be an internal block included in one apparatus.

By the above-described embodiments of the present invention, it is possible to improve precision of disparity detection and disparity control on a 3D image having superimposed information.

DESCRIPTION OF THE PREFERRED EMBODIMENTS

Figure 1:
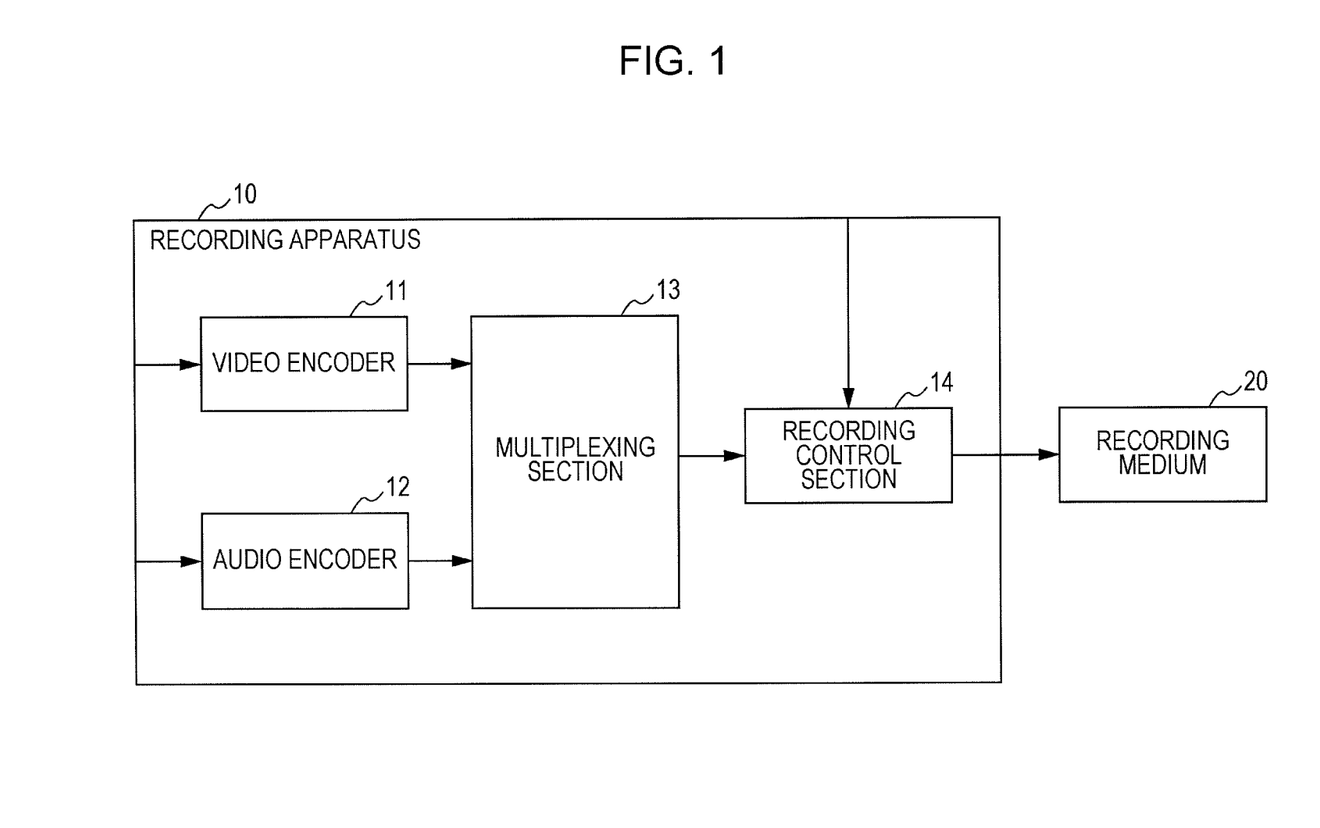
FIG. 1 is a block diagram illustrating an example of a configuration of a recording apparatus recording data of a 3D content having a data structure according to an embodiment of the present invention on a recording medium.

Example of Configuration of Recording Apparatus
Configuration Block Diagram of Recording Apparatus FIG. 1 is a block diagram illustrating an example of a configuration of a recording apparatus recording 3D-content data having a data structure according to the present invention on a recording medium.

A recording apparatus 10 in FIG. 1 includes a video encoder 11, an audio encoder 12, a multiplexing section 13, and a recording control section 14.

The recording apparatus 10 performs coding on content data of a 3D content, and records the data on a recording medium 20, such as a BDROM (Blu-Ray (a registered trademark) Disc Read Only Memory), etc. The content data includes image data (hereinafter also referred to as 3D-video data) of a 3D image, audio data corresponding to the image data, and the 3D-video data includes a left-eye image of the image data and a right-eye image of the image data.

Also, the content data includes meta data. The recording apparatus 10 records, with respect to a 3D image, superimposed-area information indicating a superimposed area, which is an area on which superimposed information is attached, on the recording medium 20 as meta data (additional information). Here, the superimposed information is information, such as subtitles, OSD (On Screen Display), a menu screen (menu image), a black-belt image of a letter box, etc. Also, the superimposed-area information is expressed in the form of, for example, upper-left-corner coordinates (pixel position) of a rectangular superimposed area, a vertical-direction length, and a horizontal-direction length, etc. In this regard, identifying the superimposed area is not limited to this. Any other method can be employed.

The video encoder 11 of the recording apparatus 10 codes 3D-video data that has been input from the outside by a coding method, such as MPEG2 (Moving Picture Experts Group phase 2), MPEG4, AVC (Advanced Video Coding), etc. The video encoder 11 supplies a video stream, which is an ES (Elementary Stream) obtained as a result of the coding, to the multiplexing section 13.

The audio encoder 12 encodes audio data corresponding to the 3D-video data input from the outside using a coding method, such as MPEG, etc., and supplies an audio stream, which is an ES obtained as a result, to the multiplexing section 13.

The multiplexing section 13 multiplexes the video stream supplied from the video encoder 11 and the audio stream supplied from the audio encoder 12, and supplies a multiplexed stream obtained as a result to the recording control section 14.

The recording control section 14 records the multiplexed stream supplied from the multiplexing section 13 on the recording medium 20. Also, the recording control section 14 records superimposed-area information input from an operation input section not shown in the figure, etc., on the recording medium 20 as a definition file.

In the recording apparatus 10 configured as described above, as meta data of a 3D content, superimposed-area information indicating a superimposed area, on which superimposed information is attached, is recorded on the recording medium 20. Thereby, it is possible to perform suitable 3D-image processing on the basis of the superimposed-area information at playback time.

Description on Recording Processing of Recording Apparatus

Figure 2:
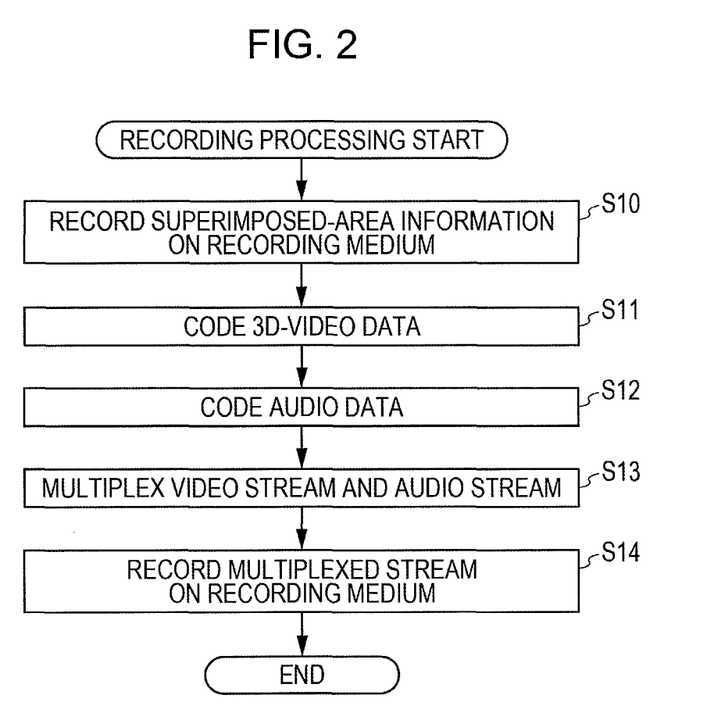
FIG. 2 is a flowchart illustrating recording processing by the recording apparatus in FIG. 1.

FIG. 2 is a flowchart illustrating recording processing by the recording apparatus 10 in FIG. 1. The recording processing is started, for example, when additional information, 3D-video data, and audio data are input.

First, in step S10, the recording control section 14 records superimposed-area information input by the operation input section, etc., on the recording medium 20 as a definition file.

In step S11, video encoder 11 codes 3D-video data input from the outside using a coding method, such as MPEG2, MPEG4, AVC, etc. And the video encoder 11 supplies a video stream obtained as a result of coding to the multiplexing section 13.

In step S12, the audio encoder 12 codes audio data corresponding to the 3D-video data input from the outside using a coding method, such as MPEG, etc., and supplies an audio stream obtained as a result, to the multiplexing section 13.

In step S13, the multiplexing section 13 multiplexes the video stream from the video encoder 11 and the audio stream from the audio encoder 12, and supplies a multiplexed stream obtained as a result to the recording control section 14.

In step S14, the recording control section 14 records the multiplexed stream supplied from the multiplexing section 13 on the recording medium 20, and the processing is terminated.

Data Structure of Additional Information

Figure 3:
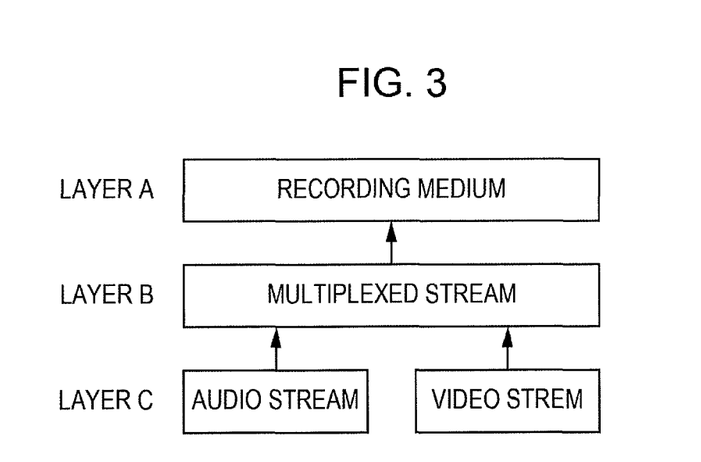
FIG. 3 is a diagram illustrating a hierarchical structure of data recorded on the recording medium.

FIG. 3 is a diagram illustrating a hierarchical structure of data recorded on the recording medium 20.

As shown in FIG. 3, a data hierarchy recorded on the recording medium 20 includes an ES layer C, such as an audio stream, a video stream, etc., a layer B which is a system layer of a multiplexed stream, and a layer A, which is unique information on the recording medium 20, etc.

In the above-described example, a description has been given that superimposed-area information as additional information is recorded on the recording medium 20 as a unique definition file, that is to say, in the layer A. However, it is also possible to record superimposed-area information as additional information in the layer B and the layer C.

For example, when additional information is recorded in the layer C, if the coding method is AVC, the additional information is recorded as SEI (Supplemental Enhancement Information), or as part of SPS (Sequence Parameter Set) or PPS (Picture Parameter Set). Also, if the coding method is MPEG2, the additional information is recorded as a video sequence or extension-and-user data (extension_and user_data).

In this case, it is possible to vary superimposed-area information in one video stream. Also, if a plurality of video streams of 3D images are recorded on one recording medium 20 with different superimposed-area information set, it is possible to provide a playback apparatus with each superimposed-area information.

On the other hand, when additional information is recorded in the layer B, additional information is recorded in a private packet of TS (Transport Stream), a private pack of PS (Program Stream), an extension area of a box included in MPEG4 configuration (Config) information, etc.

Figure 4:
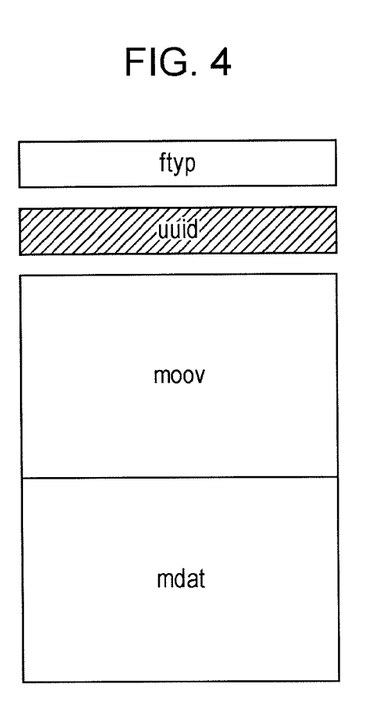
FIG. 4 is a diagram illustrating an example of an extension area of an MPEG4 box.

For example, as shown in FIG. 4, an extension area of an MPEG4 box, in which additional information is recorded, is disposed in a Private Extension box (uuid in FIG. 4)

immediately after the ftyp box located at the top of a file. In this case, a playback apparatus that plays back 3D-video data recorded on the recording medium 20 can obtain superimposed-area information before decoding processing. However, the superimposed-area information remains unchanged in a file.

In this regard, in addition to superimposed-area information, a type of codec, a bit rate, a frame size, an aspect ratio, information indicating whether an image is a 2D image, or a 3D image, etc., are described in the Private Extension box.

Figure 5:
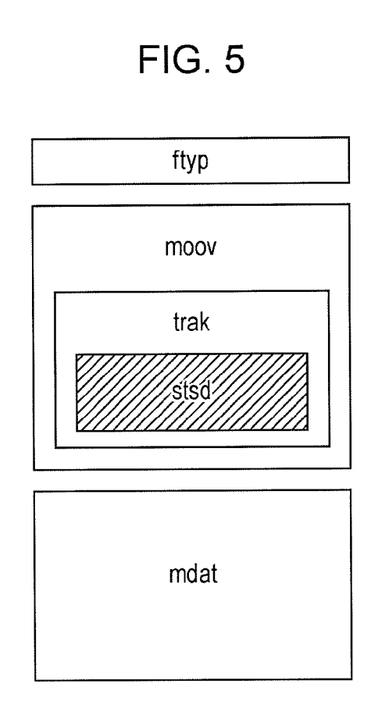
FIG. 5 is a diagram illustrating another example of an extension area of an MPEG4 box.

Also, as shown in FIG. 5, the extension area of the MPEG4 box in which additional information is recorded may be disposed in an area (stsd in FIG. 5) of track information (trak) in the moov box. In this case, the video stream includes information indicating additional information area of the reference destination. The playback apparatus obtains superimposed-area information on the basis of that information. Accordingly, in this case, superimposed-area information can be variable in the video stream. However, accessibility is worse than the case in FIG. 4.

Figure 6:
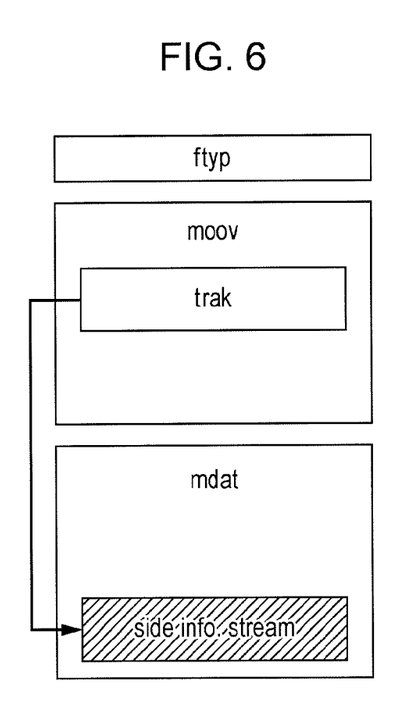
FIG. 6 is a diagram illustrating a still another example of an extension area of an MPEG4 box.

Further, as shown in FIG. 6, the extension area of the MPEG4 box in which additional information is recorded may be disposed in the mdat box. That is to say, the additional information may be recorded as one media stream (side info.stream). In this case, the video stream and the additional information are synchronized by time information, and thus superimposed-area information can be varied with moment by moment.

In this regard, in the examples from FIG. 4 to FIG. 6, the moov box and the mdat box are disposed in sequence after the ftyp box. However, the disposition of the moov box and the mdat box is not limited to this.

Playback apparatus to which an embodiment of the present invention is applied.

Configuration Block Diagram of Playback Apparatus

Figure 7:
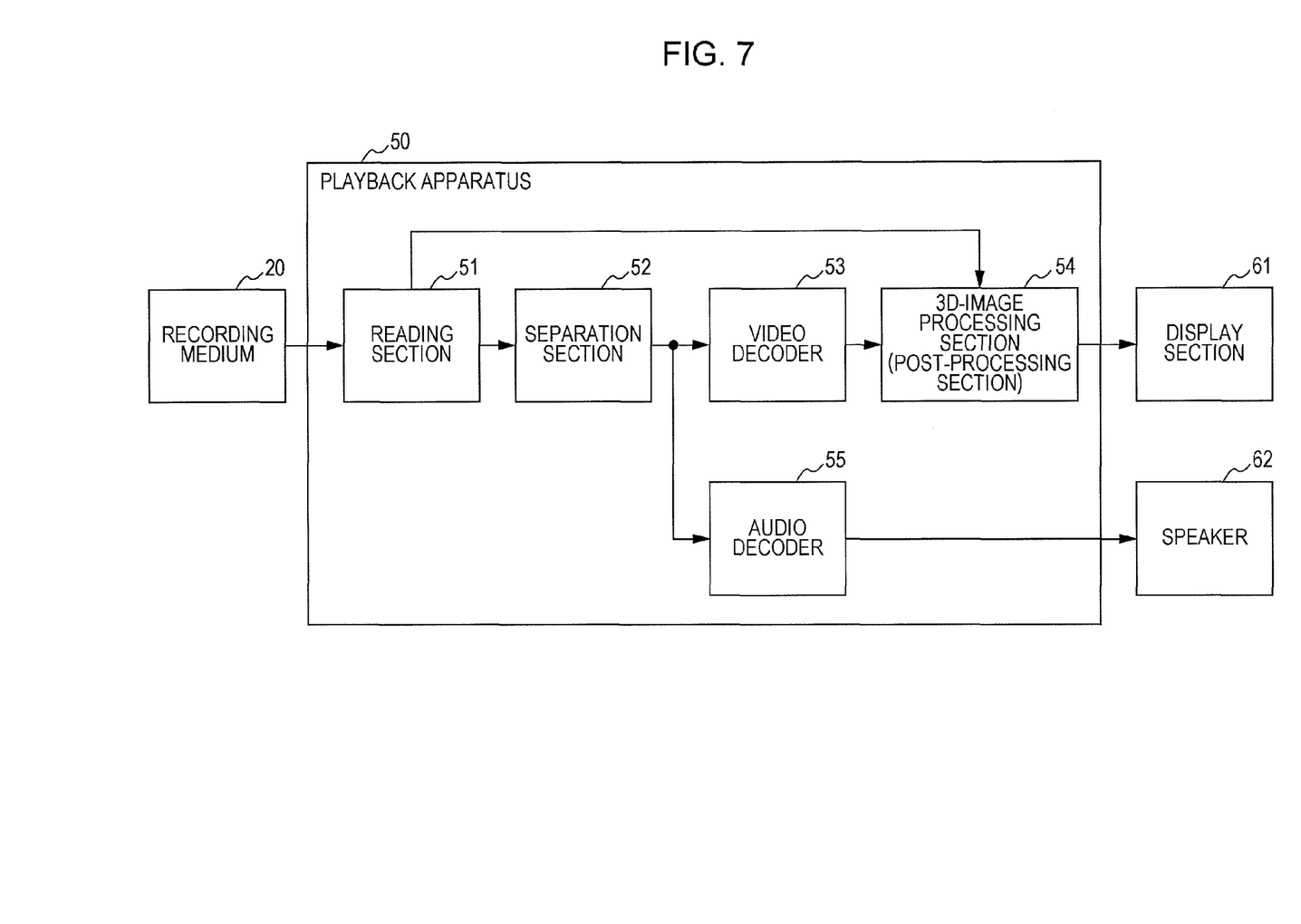
FIG. 7 is a block diagram illustrating an example of a configuration of a playback apparatus to which an embodiment of the present invention is applied.

FIG. 7 is a block diagram illustrating an example of a configuration of a playback apparatus to which an embodiment of the present invention is applied.

A playback apparatus 50 in FIG. 7 includes a reading section 51, a separation section 52, a video decoder 53, a 3D-image processing section 54, and an audio decoder 55. The playback apparatus 50 plays back 3D-video data and the corresponding audio data recorded on the recording medium 20. At the time of playing back, the playback apparatus 50 suitably performs image processing on the 3D image on the basis of the superimposed-area information, which is additional information read from the recording medium 20, and outputs the image data after the processing.

Specifically, the reading section 51 of the playback apparatus 50 reads superimposed-area information recorded on the recording medium 20, and supplies the information to the 3D-image processing section 54. Also, the reading section 51 reads a multiplexed stream recorded on the recording medium 20, and supplies the stream to the separation section 52.

The separation section 52 separates the multiplexed stream supplied from the reading section 51 into a video stream and an audio stream. And the separation section 52 supplies the video stream to the video decoder 53, and supplies the audio stream to the audio decoder 55.

The video decoder 53 decodes the video stream supplied from the separation section 52 using a method corresponding to the coding method by the video encoder 11 in FIG. 1, and supplies the 3D-video data obtained as a result to the 3D-image processing section 54.

The 3D-image processing section 54 performs predetermined image processing (post processing) on the 3D-video data supplied from the video decoder 53 using the superimposed-area information. In the present embodiment, the 3D-image processing section 54 performs generation processing of a 3D image including left-eye image and right-eye image that have different disparities on an area other than an area identified by the superimposed-area information of the 3D image. And the 3D-image processing section 54 outputs the 3D-video data after the processing to the display section 61.

The audio decoder 55 decodes the audio stream supplied from the separation section 52 using a method corresponding to the coding method by the audio encoder 12 in FIG. 1, and supplies the audio data obtained as a result to the speaker 62.

The display section 61 displays the left-eye image and the right-eye image corresponding to the 3D-video data from the 3D-image processing section 54, for example, by time sharing. At this time, the viewer wears, for example, a glass with shutters in synchronism with switching of the left-eye image and the right-eye image, and thus sees the left-eye image only through the left eye, and sees the right-eye image only through the right eye. Thereby, it is possible for a viewer to perceive the 3D image to be a stereoscopic image.

The speaker 62 outputs sound corresponding to the audio data supplied from the audio decoder 55.

Example of Detailed Configuration of 3D-Image Processing Section 54

Figure 8:
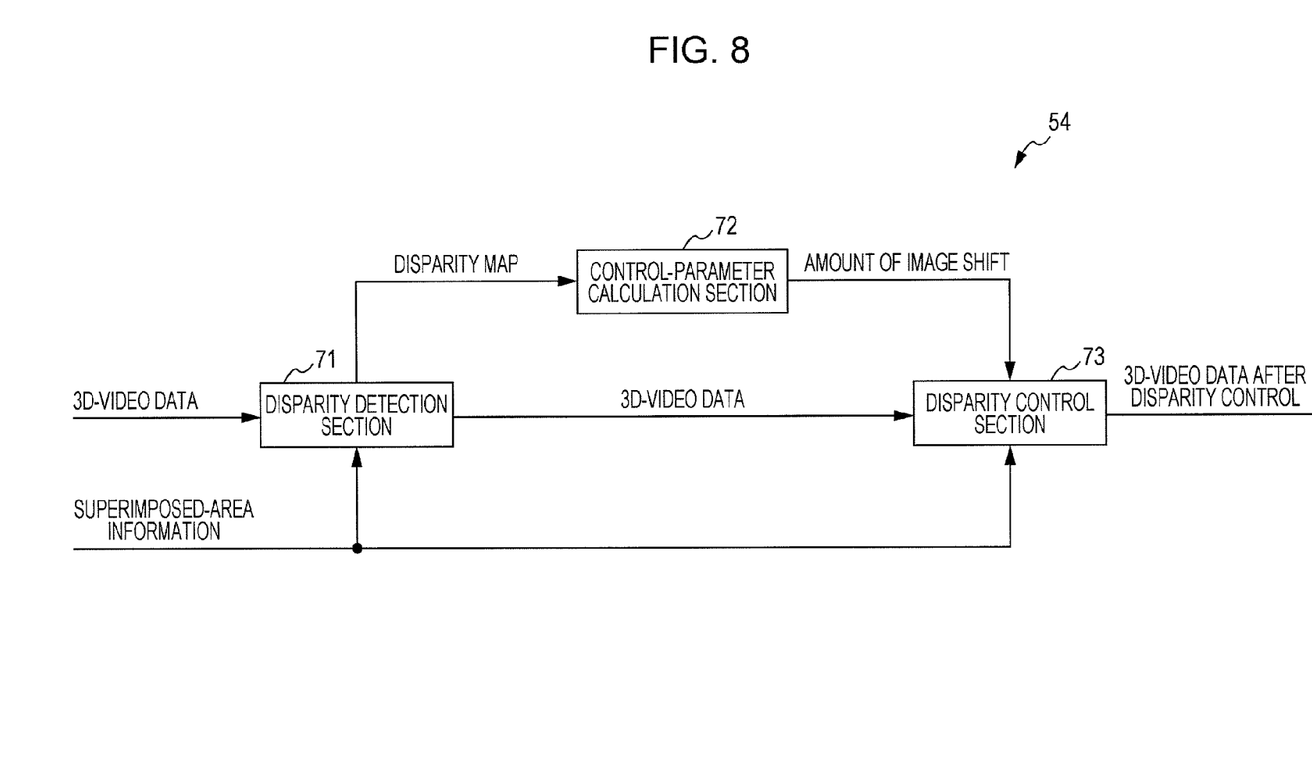
FIG. 8 is a block diagram illustrating an example of a detailed configuration of a 3D-image processing section.

FIG. 8 is a block diagram illustrating an example of a detailed configuration of the 3D-image processing section 54 in FIG. 7.

The 3D-image processing section 54 includes a disparity detection section 71, a control-parameter calculation section 72, and a disparity control section 73.

The superimposed-area information supplied from the reading section 51 is obtained from the disparity detection section 71 and the disparity control section 73. Also, the 3D-video data supplied from the video decoder 53 is obtained by the disparity detection section 71.

The disparity detection section 71 directly supplies the 3D-video data supplied from the video decoder 53 to the disparity control section 73. Also, the disparity detection section 71 detects an amount of disparity of each pixel of the left-eye image and the right-eye image using, for example, a method of block matching, etc., on areas excluding the superimposed area identified by the superimposed-area information of the left-eye image and the right-eye image of the 3D-video data. The disparity detection section 71 supplies the detected amount of disparity of each pixel of the left-eye image and the right-eye image, for example, as a disparity map, in which the size of the amount of disparity is expressed by a luminance value, to the control-parameter calculation section 72. In this regard, the control-parameter calculation section 72 ought to grasp the detected amount of disparity of each pixel, and thus the amount may be supplied in any format in addition to a disparity map.

The control-parameter calculation section 72 calculates control parameters for the disparity control section 73 performing control on the basis of the amount of disparity of each pixel of the left-eye image and the right-eye image, which is supplied from the disparity detection section 71. Specifically, the disparity control section 73 performs image shift processing for shifting the left-eye image and the right-eye image in a direction having the disparity (in a lateral direction). The control-parameter calculation section 72 calculates the amount of image shift in the image shift processing as control parameters.

For example, the control-parameter calculation section 72 calculates the average value of the amount of disparity of each pixel from the disparity map supplied from the disparity detection section 71, and calculates an amount of image shift that produces the average value of 0. When the average value of the amount of disparity of each pixel is 50 pixels, the value of 25 pixels is supplied from the control-parameter calculation section 72 to the disparity control section 73 as the amount of image shift. At this time, the disparity control section 73 shifts the right-eye image to the left by 25 pixels, and shifts the left-eye image to the left by 25 pixels on the basis of the amount of image shift by 25 pixels so that the average value of the amount of disparity can be 0.

Also, for example, the control-parameter calculation section 72 calculates a minimum value of the amount of disparity of each pixel from the disparity map supplied from the disparity detection section 71, calculates a necessary amount of image shift in order not for the minimum value to exceed the distance of the two eyes, and supplies the value to the disparity control section 73. For example, assuming that the distance between the two eyes is 65 mm, and the display size is 42 inches, the control-parameter calculation section 72 calculates the amount of image shift such that the minimum value of the amount of disparity is not greater than 122 pixels.

In this regard, in the present embodiment, a positive amount of disparity represents a pop-out direction (in the near direction), and a negative amount represents a retracting direction.

The disparity control section 73 controls the disparity between the left-eye image and the right-eye image of the 3D-video data on the basis of the control parameters supplied from the control-parameter calculation section 72. That is to say, the disparity control section 73 performs image shift processing on an area excluding the superimposed area identified by the superimposed-area information of the left-eye image and the right-eye image on the basis of the amount of image shift supplied from the control-parameter calculation section 72. The disparity control section 73 outputs the image data of the left-eye image and the right-eye image after the image shift processing as the 3D-video data after the disparity control to the display section 61 (FIG. 7).

Example of Processing by 3D-Image Processing Section 54

Figure 9:
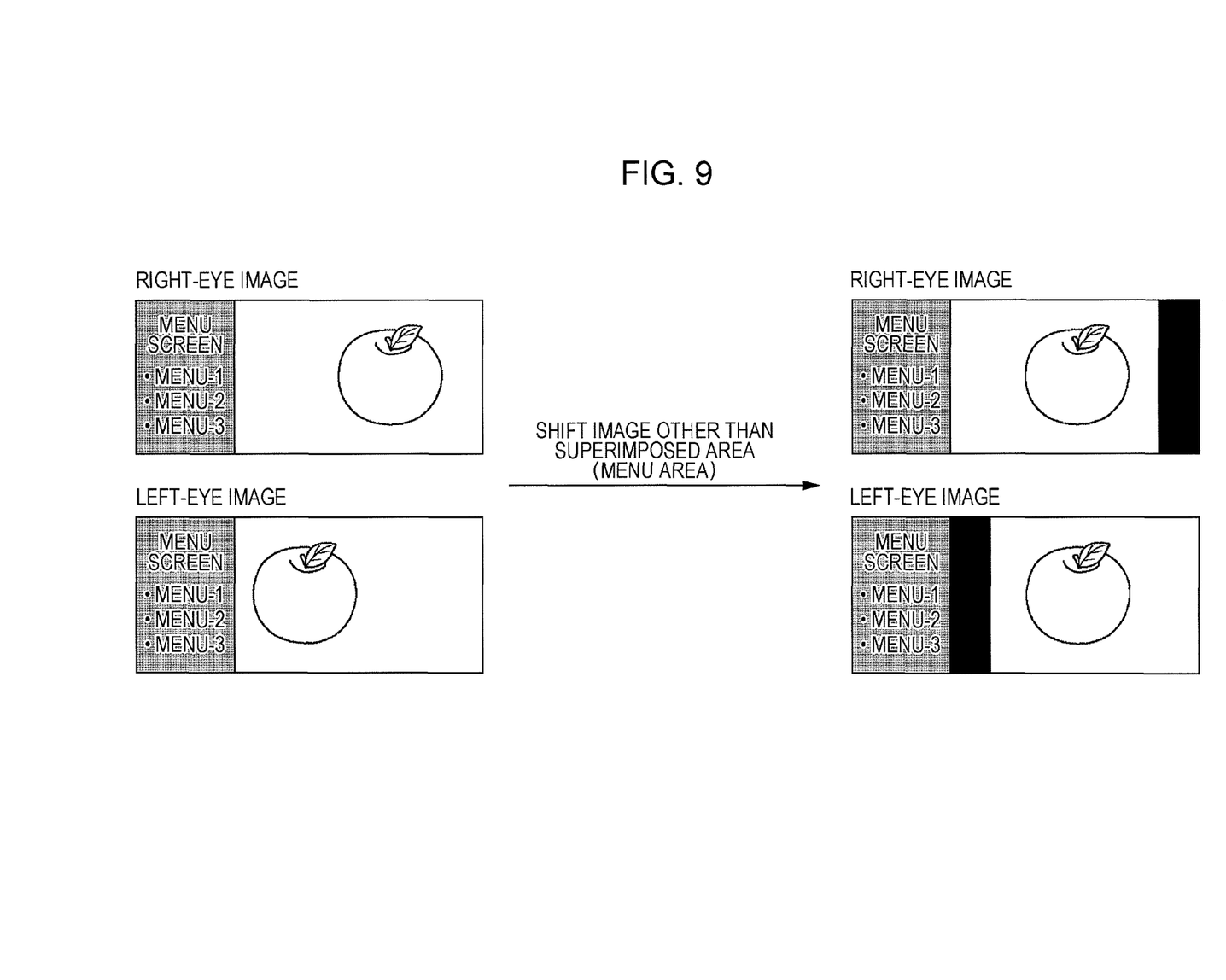
FIG. 9 is a diagram illustrating an effect of the 3D-image processing section.

FIG. 9 illustrates an example of processing by the 3D-image processing section 54.

As shown on the left side in FIG. 9, a menu screen is attached on the left-eye image and the right-eye image of the 3D-video data supplied from the video decoder 53. That is to say, the superimposed information in this case is the menu screen, and the superimposed-area information obtained from the recording medium 20 is information identifying an area of the menu screen (hereinafter referred to as a menu area).

The disparity detection section 71 detects an amount of disparity between the left-eye image and the right-eye image of an image of an area excluding the menu area, which is the superimposed area, and supplies the disparity map as a detection result to the control-parameter calculation section 72.

The control-parameter calculation section 72 calculates the average value of the amount of disparity of each pixel from the disparity map supplied from the disparity detection section 71, and calculates an amount of image shift that produces the average value of 0 on the basis of the disparity map supplied from the disparity detection section 71. In the example in FIG. 9, the amount of image shift is calculated such that the amount of disparity of apples becomes 0.

As shown on the right side in FIG. 9, the disparity control section 73 shifts an image of an area excluding the menu area, which is the superimposed area of the left-eye image and the right-eye image by the amount of image shift supplied from the control-parameter calculation section 72. In this manner, the left-eye image and the right-eye image are determined such that the average value of the amount of disparity of each pixel becomes 0, and thereby it is possible to produce an image that is easy to see and gives little sense of fatigue to a viewing user.

Figure 10:
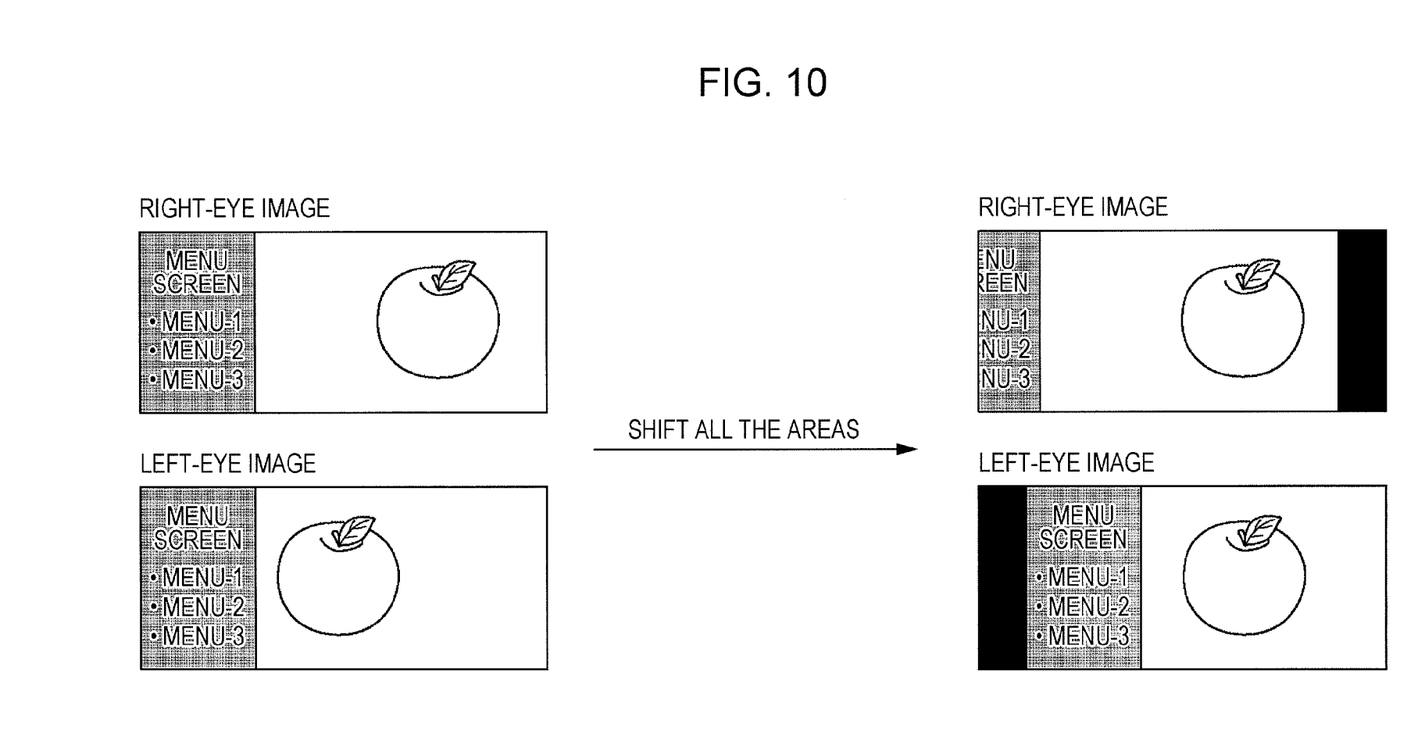
FIG. 10 is a diagram illustrating an effect of the 3D-image processing section.

On the other hand, FIG. 10 shows a result of the case where the superimposed-area information is not provided, and the disparity control section 73 has entirely shifted the left-eye image and the right-eye image by the amount of image shift supplied from the control-parameter calculation section 72.

When the superimposed area is not considered, as shown in FIG. 10, part of the menu screen becomes unseen, or a disparity occurs on the menu screen, and thus the depth of the menu screen is converted. Accordingly, it becomes difficult to see.

As described above, a disparity is detected using the superimposed-area information so that it is possible to improve precision of disparity detection, and to achieve disparity control that is suitable for the user's viewing. As a result, it is possible to provide the user with a 3D image that is easy to see for the user.

Description of Playback Processing of Playback Apparatus

Figure 11:
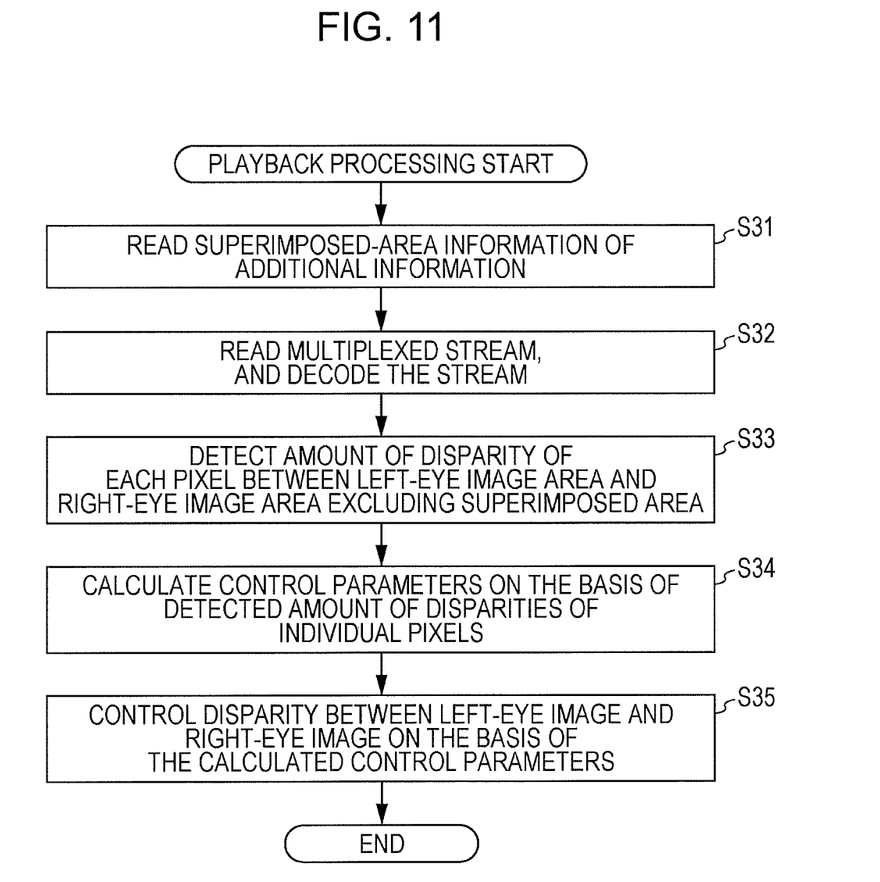
FIG. 11 is a flowchart illustrating playback processing by the playback apparatus in FIG. 7.

FIG. 11 is a flowchart illustrating playback processing by the playback apparatus 50. The playback processing is started when the user instructs to play back the 3D content recorded on the recording medium 20, for example.

First, in step S31, the reading section 51 reads the superimposed-area information recorded on the recording medium 20 as additional information, and supplies the information to the disparity detection section 71 and the disparity control section 73 of the 3D-image processing section 54.

In step S32, the playback apparatus 50 reads the multiplexed stream of the 3D-content recorded on the recording medium 20, and decodes the stream. That is to say, the reading section 51 reads the multiplexed stream of the 3D-content from the recording medium 20, and supplies the stream to the separation section 52. The separation section 52 separates the multiplexed stream into a video stream and an audio stream. The video decoder 53 decode the video stream using a method corresponding to the coding method of the recording apparatus 10, and supplies the 3D-video data obtained as a result to the 3D-image processing section 54. The audio decoder 55 decodes the audio stream using a method corresponding to the coding method of the recording apparatus 10, and supplies the audio data obtained as a result to the speaker 62.

In step S33, the disparity detection section 71 of the 3D-image processing section 54 detects an amount of disparity of each pixel of the left-eye image and the right-eye image on an area excluding the superimposed area identified by the superimposed-area information of the left-eye image and the right-eye image of the 3D-video data. The detected amount of disparity of each pixel is supplied, for example, as a disparity map, in which the size of the amount of disparity is expressed by a luminance value, to the control-parameter calculation section 72.

In step S34, the control-parameter calculation section 72 calculates control parameters for the disparity control section 73 performing control on the basis of the amount of disparity of each pixel, which has been detected by the disparity detection section 71. For example, the control-parameter calculation section 72 calculates the average value of the amount of disparity of each pixel from the disparity map supplied from the disparity detection section 71, and calculates an amount of image shift that produces the average value of 0. The resultant amount of image shift is supplied to the disparity control section 73.

In step S35, the disparity control section 73 controls the disparity between the left-eye image and the right-eye image of the 3D-video data on the basis of the control parameters calculated by the control-parameter calculation section 72. Specifically, the disparity control section 73 performs image shift processing on an area excluding the superimposed area identified by the superimposed-area information of the left-eye image and the right-eye image of the 3D-video data on the basis of the amount of image shift supplied from the control-parameter calculation section 72. Also, in step S35, the audio decoder 55 outputs the audio data corresponding to the 3D-video data, and the processing is terminated.

As described above, in addition to a 3D-content multiplexed stream, superimposed-area information of the 3D image is recorded on the medium 20 as additional information. The playback apparatus 50 reads the superimposed-area information, and performs disparity detection processing and disparity control processing between the left-eye image and the right-eye image on an area excluding the superimposed area identified by the superimposed-area information of the left-eye image and the right-eye image of the 3D-video data obtained by the decoding. Using the superimposed-area information provided as additional information, it is possible to improve precision of the disparity detection and the disparity control on the 3D image having a superimposed area.

Example of Another Configuration of 3D-Image Processing Section 54

Figure 12:
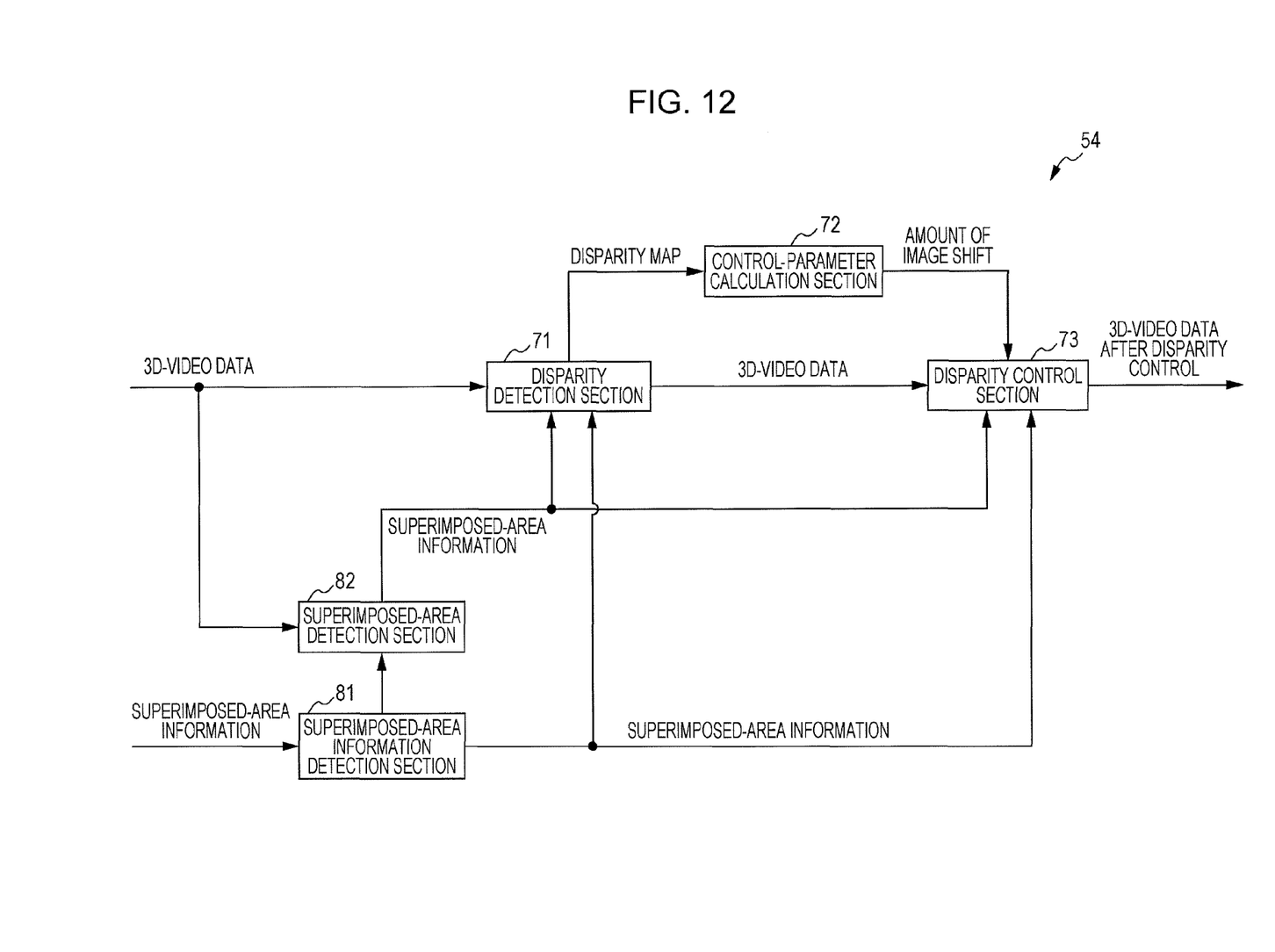
FIG. 12 is a block diagram illustrating another example of a detailed configuration of a 3D-image processing section.

FIG. 12 is a block diagram illustrating another example of a detailed configuration of the 3D-image processing section 54.

The 3D-image processing section 54 in FIG. 12 includes an superimposed-area information detection section 81 and a superimposed-area detection section 82 in addition to the disparity detection section 71, the control-parameter calculation section 72, and the disparity control section 73 in the same manner as the 3D-image processing section 54 in FIG. 8.

The 3D-image processing section 54 in FIG. 12 has a configuration capable of processing in the case where superimposed-area information is not recorded on the recording medium 20 as additional information. That is to say, the 3D-image processing section 54 in FIG. 12 determines whether superimposed-area information is recorded on the recording medium 20. If superimposed-area information is not recorded on the recording medium 20, the 3D-image processing section 54 in FIG. 12 detects a superimposed area from the left-eye image and the right-eye image of the 3D-video data by itself, and supplies the superimposed-area information to the disparity detection section 71 and the disparity control section 73.

If superimposed-area information is recorded on the recording medium 20, the superimposed-area information is read by the reading section 51, and is supplied to the superimposed-area information detection section 81. Accordingly, the superimposed-area information detection section 81 determines whether superimposed-area information is recorded on the recording medium 20 as additional information depending on whether superimposed-area information is supplied from the reading section 51.

If superimposed-area information is supplied from the reading section 51, the superimposed-area information detection section 81 directly supplies the obtained superimposed-area information to the disparity detection section 71 and the disparity control section 73. On the other hand, if superimposed-area information is not supplied from the reading section 51, the superimposed-area information detection section 81 gives a detection instruction for detecting a superimposed area to the superimposed area detection section 82.

The video decoder 53 supplies 3D-video data to the superimposed area detection section 82. If the superimposed-area information detection section 81 supplies a detection instruction, the superimposed area detection section 82 detects individual superimposed areas of the left-eye image and the right-eye image of the 3D-video data. The superimposed-area detection section 82 changes the superimposed area obtained as a result of the detection into the same format of the superimposed-area information as the superimposed-area information output by the superimposed-area information detection section 81, and supplies the information to the disparity detection section 71 and the disparity control section 73.

In this regard, a method of detecting a superimposed area, which is performed by the superimposed-area detection section 82 is not specifically limited, and any method of detection can be employed. For example, it is possible to employ processing of detecting an area that is unchanged for a predetermined time period as a telop area, which has been disclosed in Japanese Unexamined Patent Application Publication No. 2008-166988 by the present applicant.

In the 3D-image processing section 54 having the above-described configuration, if superimposed-area information is included in content data, disparity detection and disparity control are performed using the superimposed-area information. On the other hand, if superimposed-area information is not included in content data, superimposed areas are detected from the left-eye image and the right-eye image of the 3D-video data, and disparity detection and disparity control are performed using the superimposed-area information of the detected superimposed areas.

Disparity Control Processing in 3D-Image Processing Section 54

Figure 13:
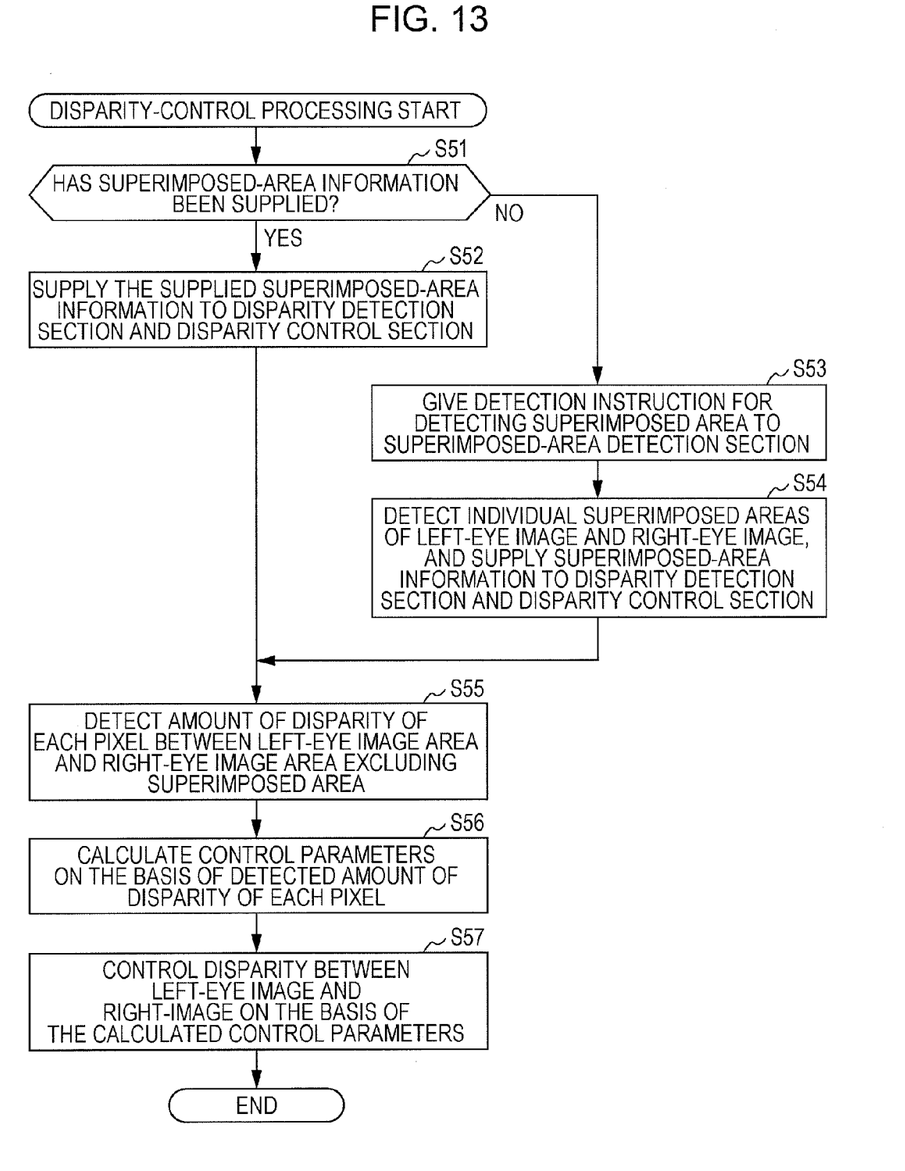
FIG. 13 is a flowchart illustrating disparity control processing by the 3D-image processing section in FIG. 12.

FIG. 13 is a flowchart illustrating disparity control processing by the 3D-image processing section 54 in FIG. 12.

In the disparity control processing, first, in step S51, the superimposed-area information detection section 81 determines whether the superimposed-area information has been supplied from the reading section 51.

In step S51, if determined that the superimposed-area information has been supplied, the processing proceeds to step S52, and the superimposed-area information detection section 81 supplies the superimposed-area information supplied from the reading section 51 to the disparity detection section 71 and the disparity control section 73.

On the other hand, in step S51, if determined that the superimposed-area information has not been supplied, the processing proceeds to step S53, the superimposed-area information detection section 81 gives a detection instruction for detecting a superimposed area to the superimposed area detection section 82. And in step S54, the superimposed-area detection section 82 having been supplied with the detection instruction detects individual superimposed areas of the left-eye image and the right-eye image of the 3D-video data, and supplies the superimposed-area information to the 3D-video data disparity detection section 71 and the disparity control section 73.

Processing in steps S55 to S57, which is executed after the processing in step S52 or S54, is the same as the processing in steps S33 to S35 in FIG. 11, and thus the description thereof is omitted.

By the above-described disparity control processing, if superimposed-area information is not included in content data, the 3D-image processing section 54 in FIG. 12 detects the superimposed area of the left-eye image and the right-eye image of the 3D-video data by itself. And the 3D-image processing section 54 in FIG. 12 performs disparity detection processing and disparity control processing on an area excluding the detected superimposed area of the left-eye image and the right-eye image of the 3D-video data. Thereby, it is possible to improve precision of the disparity detection and the disparity control on the 3D image having a superimposed area.

In this regard, in the above-described examples, descriptions have been given of examples in which the present invention is applied to a playback apparatus. However, the present invention can be applied to an apparatus other than a playback apparatus. For example, content data of a 3D content may be provided by transmission through a network, such as satellite broadcasting, cable TV, the Internet, etc. Accordingly, the present invention can be applied to a display apparatus and a recording/playback apparatus which receive superimposed-area information included in the content data of a 3D content that is transmitted through a network, and perform predetermined disparity-detection and disparity-control processing on an area other than the area identified by the superimposed-area information. Also, the present invention may be configured to be a stand-alone image-processing apparatus that obtains superimposed-area information as meta data of a 3D content, performs processing on an area other than the area identified by superimposed-area information of a left-eye image and a right-eye image, and outputs the result.

Description of Computer to which the Present Invention is Applied

The above-described series of processing can be executed by hardware or by software. When the series of processing is executed by software, programs constituting the software may be installed in a general-purpose computer, etc.

Figure 14:
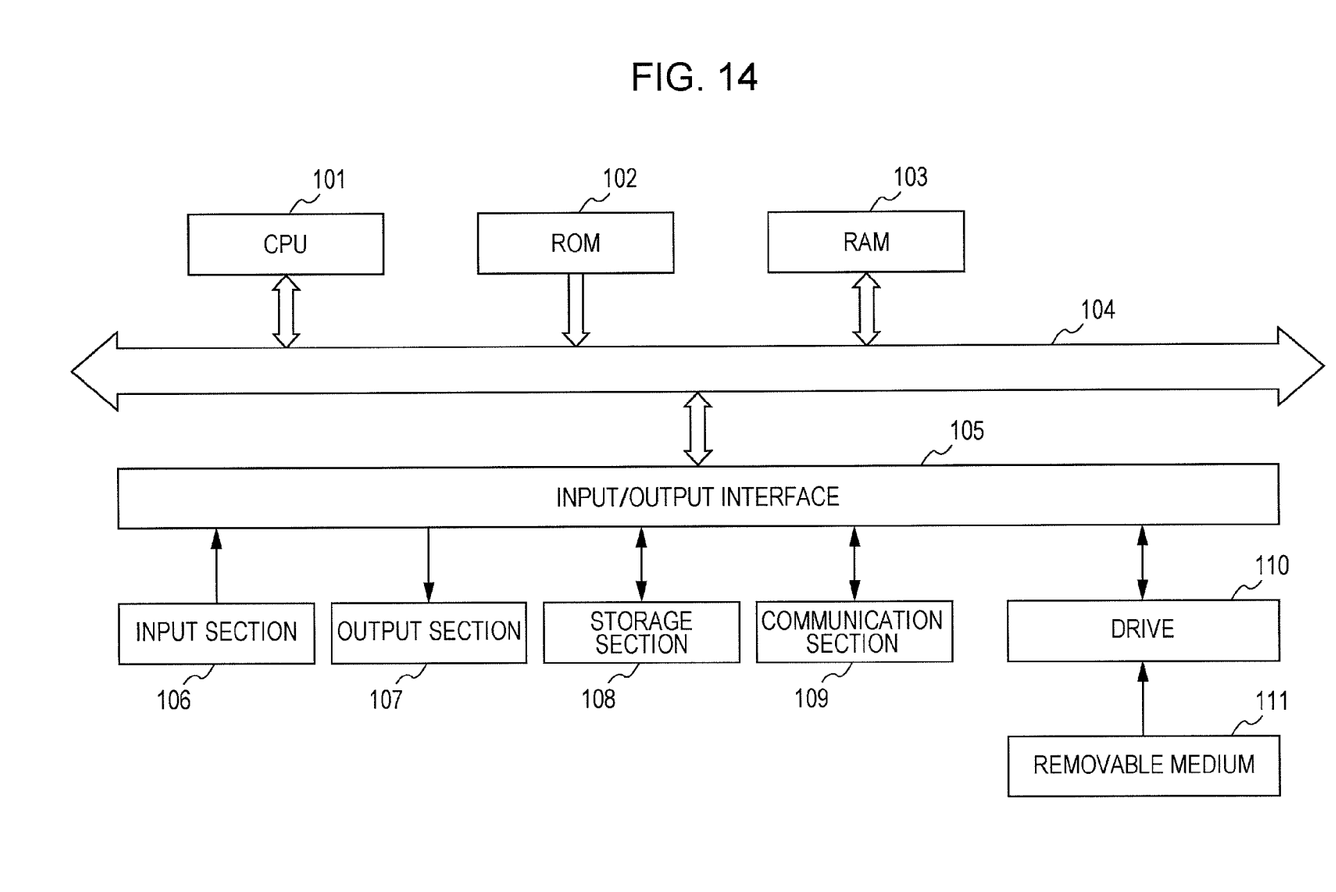
FIG. 14 is a block diagram illustrating an example of a configuration of a computer to which an embodiment of the present invention is applied.

Thus, FIG. 14 illustrates an example of a configuration of a computer in which the programs performing the above-described series of processing are installed.

The programs can be recorded in advance in a storage section 108 or a ROM (Read Only Memory) 102 as a recording medium built in the computer.

Alternatively, the programs can be stored (recorded) on a removable medium 111. Such a removable medium 111 can be provided as so-called package software. Here, for the removable medium 111, for example, there are a CD-ROM (Compact Disc Read Only Memory), an MO (Magneto Optical) disc, a DVD (Digital Versatile Disc), a magnetic disk, a semiconductor memory, etc.

In this regard, the programs can be installed in the computer from the above-described removable medium 111 through a drive 110. In addition, the programs can be downloaded to the computer through a communication network or a broadcasting network, and can be installed in the internal storage section 108. That is to say, the programs can be received by the communication section 109 through a wired or wireless transmission medium and can be installed in the storage section 108.

The computer includes a CPU (Central Processing Unit) 101, and an input/output interface 105 is connected to the CPU 101 through a bus 104.

When the user inputs an instruction by operating the input section 106, etc., through the input/output interface 105, the CPU 101 executes the programs stored in the ROM 102 in accordance with the instruction. Alternatively, the CPU 101 loads the programs stored in the storage section 108 into the RAM (Random Access Memory) 103 to execute the programs.

Thereby, the CPU 101 performs processing in accordance with the above-described flowchart. Alternatively, the CPU 101 performs processing by the configuration having the above-described block diagram. And the CPU 101 outputs the processing result from the output section 107 through the input/output interface 105, for example, as necessary. Alternatively, the CPU 101 transmits the processing result from the communication section 109, and further records the result in the storage section 108, and the like.

In this regard, the input section 106 includes a keyboard, a mouse, a microphone, etc. Also, the output section 107 includes an LCD (Liquid Crystal Display), a speaker, etc.

In this specification, processing performed by a computer in accordance with the programs are not necessarily processed in time series in accordance with the described sequence as flowcharts. That is to say, the processing performed by the computer in accordance with the programs includes processing to be performed in parallel or individually (for example, parallel processing or object processing).

Also, the program may be processed by one computer (processor), and may be distributedly performed by a plurality of computers. Further, the programs may be transferred to a remote computer, and may be performed there.

In the above-described embodiments, descriptions have been given of the cases where a 3D image is viewed from two viewpoints. However, it is possible to similarly apply the present invention to the cases where a 3D image is viewed from a multiple viewpoints, that is to say, when the number of viewpoints is three or more.

The present application contains subject matter related to that disclosed in Japanese Priority Patent Application JP 2010-097213 filed in the Japan Patent Office on Apr. 20, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An image processing apparatus, comprising:
a memory to store image data representing a 3D image, the image data including:
first image data representing a left-eye image;
second image data representing a right-eye image; and
positional information regarding superimposed-areas included in the left-eye image and the right-eye image, the superimposed-areas being areas of the left-eye image and the right-eye image having information superimposed on the left-eye image and the right-eye image; and a processor, which
    accesses the image data;
    determines an amount of disparity in the left-eye image and the right-eye image, excluding the superimposed-areas; and
    shifts the whole left-eye image and the whole right-eye image according to the amount of disparity, excluding the superimposed-areas.

2. The image processing apparatus according to claim 1, wherein the processor:
    calculates a control parameter on the basis of the amount of disparity; and
    adjusts the amount of disparity on the basis of the control parameter.

3. The image processing apparatus according to claim 2, wherein the processor:
    determines the control parameter by calculating an amount of image shift on the basis of the amount of disparity; and
    adjusts the amount of disparity by performing image-shift processing of the whole left-eye image and the whole right-eye image on the basis of the amount of image shift.

4. The image processing apparatus according to claim 1, wherein the processor:
    determines whether the positional information is included in the image data;
    detects the superimposed-areas when the positional information is not included in the image data; and
    determines the positional information based on the detection.

5. A computer-implemented method of processing an image, the method comprising the steps of:
    storing image data representing a 3D image in a memory, the image data including:
        first data representing a left-eye image including:
            a first image area; and
            a first superimposed-area other than the first image area, the first superimposed-area having information superimposed on the left-eye image;
        second data representing a right-eye image including:
            a second image area; and
            a second superimposed-area other than the second image area, the second superimposed-area having the information superimposed on the right- eye image; and
        positional information regarding the first superimposed-area and the second superimposed-area;
    accessing, using a processor, the image data stored in the memory;
    determining, using the processor, an amount of disparity in the first image area and the second image area; and
    shifting the whole first image area and the whole second image area according to the amount of disparity.

6. A non-transitory computer-readable medium storing instructions, which when executed by a processor, cause a computer to perform processing comprising the steps of:
    acquiring image data representing a 3D image, the image data including:
        first data representing a left-eye image including:
            a first image area; and
            a first superimposed-area other than the first image area, the first superimposed-area having information superimposed on the left-eye image; and
        second data representing a right-eye image including:
            a second image area; and
            a second superimposed-area other than the second image area, the second superimposed-area having the information superimposed on the right-eye image; and
        positional information regarding the first superimposed-area and the second superimposed-area;
    determining an amount of disparity in the first image area and the second image area; and
    shifting the whole first image area and the whole second image area according to the amount of disparity.

7. An image processing apparatus comprising:
    a memory to store image data representing a 3D image, the image data including:
        first data representing a left-eye image including:
            a first image area; and
            a first superimposed-area other than the first image area, the first superimposed-area having information superimposed on the left-eye image;
        second data representing a right-eye image including:
            a second image area; and
            a second superimposed-area other than the second image area, the second superimposed-area having the information superimposed on the right- eye image; and
        positional information regarding the first superimposed-area and the second superimposed-area; and
    a processor, which
        accesses the image data;
        determines an amount of disparity in the first image area and the second image area; and
        shifts the whole first image area and the whole second image area according to the amount of disparity.

8. The image processing apparatus of claim 7, wherein the first superimposed-area and the second superimposed-area display meta data associated with the 3D image.

9. The image processing apparatus of claim 8, wherein the meta data includes at least one of subtitles, on screen display, a menu screen, and a black-belt image of a letter box.

10. The image processing apparatus of claim 7, wherein the amount of disparity is an average of the amounts of disparity of pixels in the first image area and the second image area.

11. The image processing apparatus of claim 10, wherein the processor calculates an amount of image shift as half of the amount of disparity.

12. The image processing apparatus of claim 11, wherein the processor:
    shifts the whole first image area to the right by the amount of image shift; and
    shifts the whole second image area to the left by the amount of image shift.

13. The image processing apparatus of claim 12, wherein the processor:
    determines a minimum amount of disparity in the first image area and the second image area; and
    calculates an amount of image shift such that the minimum amount of disparity is less than a distance between eyes of a viewer.

14. The computer-implemented image processing method of claim 5, further including:
    calculating an amount of image shift on the basis of the amount of disparity.

15. The computer-implemented image processing method of claim 14, wherein determining the amount of disparity includes determining an average of amounts of disparity of pixels in the first image area and the second image area.

16. The computer-implemented image processing method of claim 14, wherein the processor calculates an amount of image shift as half of the amount of disparity.

17. The computer-implemented image processing method of claim 16, further including:
shifting the whole first image area to the right by the amount of image shift; and
shifting the whole second image area to the left by the amount of image shift.

18. A computer-implemented method of processing an image, the method comprising the steps of:
storing image data representing a 3D image in a memory, the image data including:
first data representing a left-eye image;
second data representing a right-eye image; and
positional information regarding superimposed-areas included in the left-eye image and the right-eye image, the superimposed-areas being areas of the left-eye image and the right-eye image having superimposed information;
accessing, using a processor, the image data stored in the memory;
detecting, using the processor, an amount of disparity in the left-eye image and the right-eye image, excluding the superimposed-areas; and
shifting the whole left-eye image and the whole right-eye image according to the amount of disparity, excluding the superimposed-areas.

19. The image processing apparatus according to claim 1, wherein the positional information is stored as a definition file.

20. The image processing apparatus according to claim 1, wherein the superimposed-areas are an on screen display, a menu-screen, or a black-belt image of a letter box.

21. The image processing apparatus according to claim 1, wherein the processor further determines an amount of disparity of each pixel in the left-eye image and the right-eye image, excluding the superimposed-areas.

22. The image processing apparatus according to claim 21, wherein the processor further supplies the amount of disparity of each pixel of the left-eye and the right eye image as a disparity map, in which a size of the amount of disparity is expressed by a luminance value.

* * * * *